(12) United States Patent  
Bastyr

(10) Patent No.: US 11,351,916 B2  
(45) Date of Patent: Jun. 7, 2022

(54) VEHICLE SOUND SYNTHESIS DURING ENGINE START CONDITIONS

(71) Applicant: HARMAN INTERNATIONAL INDUSTRIES, INCORPORATED, Stamford, CT (US)

(72) Inventor: Kevin J. Bastyr, Franklin, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 622 days.

(21) Appl. No.: 16/144,589

(22) Filed: Sep. 27, 2018

(65) Prior Publication Data

US 2020/0101896 A1 Apr. 2, 2020

(51) Int. Cl.
  *B60Q 5/00* (2006.01)
  *B60Q 9/00* (2006.01)
  *G10K 15/02* (2006.01)

(52) U.S. Cl.
  CPC .............. *B60Q 5/008* (2013.01); *B60Q 9/00* (2013.01); *G10K 15/02* (2013.01)

(58) Field of Classification Search
  CPC .......... B60Q 5/008; B60Q 9/00; G10K 15/02; B60R 16/023
  See application file for complete search history.

(56) References Cited

U.S. PATENT DOCUMENTS

| | | | |
|---|---|---|---|
| 8,885,845 B2 | 11/2014 | Honji et al. | |
| 9,271,073 B2 | 2/2016 | Valeri et al. | |
| 9,553,553 B2 | 1/2017 | Christoph | |
| 2010/0089307 A1 | 4/2010 | Kenchington | |
| 2012/0106748 A1* | 5/2012 | Peachey | G10K 15/04 381/61 |
| 2013/0294619 A1 | 11/2013 | Valeri et al. | |
| 2014/0056438 A1* | 2/2014 | Baalu | G10K 15/02 381/86 |

(Continued)

FOREIGN PATENT DOCUMENTS

| | | | |
|---|---|---|---|
| JP | 2007264332 | * 10/2007 | ............. G10K 15/04 |
| WO | 2010114248 A2 | 10/2010 | |

(Continued)

OTHER PUBLICATIONS

JP2007264332 English translation (Year: 2007).*

(Continued)

*Primary Examiner* — Abby Y Lin
*Assistant Examiner* — Danielle Marie Jackson
(74) *Attorney, Agent, or Firm* — Brooks Kushman P.C.

(57) ABSTRACT

A vehicle sound synthesis system is provided with a loudspeaker and a controller. The loudspeaker projects sound indicative of synthesized engine noise (SEN) within a cabin of a vehicle in response to receiving a SEN signal. The controller is programmed to generate the SEN signal; and receive a first input indicative of an engine start command. The controller is further programmed to, modulate a characteristic of the SEN signal to align with a corresponding engine operating characteristic during starting conditions in response to the engine start command; and provide an adjusted SEN signal including the modulated characteristic to the loudspeaker.

20 Claims, 4 Drawing Sheets

(56) References Cited

U.S. PATENT DOCUMENTS

2014/0177866 A1    6/2014  Peachey et al.
2014/0210216 A1*   7/2014  Konishi ................ B60W 20/00
                                                    290/38 R

FOREIGN PATENT DOCUMENTS

WO    2017067570 A1    4/2017
WO    2017099468 A1    6/2017

OTHER PUBLICATIONS

Harman International Industries, Inc., International Application No. PCT/US18/35414 filed May 13, 2018 for "System and Method for Steady State Vehicle Sound Synthesis." (31 pages).
Harman International Industries, Inc., International Application No. PCT/US18/37042 filed Jun. 12, 2018 for "System and Method for Adaptive Magnitude Vehicle Sound Synthesis." (33 pages).

* cited by examiner

VEHICLE SOUND SYNTHESIS DURING ENGINE START CONDITIONS

TECHNICAL FIELD

One or more embodiments relate to a vehicle system and method for synthesizing sound during engine start/stop conditions.

BACKGROUND

Vehicles include components that generate noise that is typically audible to a driver and any passengers within the passenger compartment. For example, a driver may hear noise generated by an engine of a powertrain, and an exhaust system of the vehicle. Such noise may be reduced or absent in new vehicle architectures and driving modes. For example, a hybrid electric vehicle (HEV) may operate as an electric vehicle (EV) with the internal combustion engine (ICE, engine, or IC engine) off, during which the HEV does not generate typical engine noise. This absence of engine noise may be unexpected for a driver. Therefore, a vehicle audio system may generate synthetic noise that represents typical or expected noise generated while operating the vehicle.

SUMMARY

In one embodiment, a vehicle sound synthesis system is provided with a loudspeaker and a controller. The loudspeaker projects sound indicative of synthesized engine noise (SEN) within a cabin of a vehicle in response to receiving a SEN signal. The controller is programmed to generate the SEN signal; and receive a first input indicative of an engine start command. The controller is further programmed to, modulate a characteristic of the SEN signal to align with a corresponding engine operating characteristic during starting conditions in response to the engine start command; and provide an adjusted SEN signal including the modulated characteristic to the loudspeaker.

In another embodiment, an apparatus is provided a controller that is configured to: generate a SEN signal indicative of synthesized engine noise (SEN). The controller is further configured to: modulate a characteristic of the SEN signal to align with a corresponding predetermined engine operating characteristic during starting conditions, in response to receipt of an engine start signal; and provide an adjusted SEN signal, including the modulated characteristic, to a loudspeaker for projecting sound within a vehicle cabin.

In yet another embodiment, a computer-program product embodied in a non-transitory computer readable medium that is programmed for synthesizing engine noise (SEN) is provided. An engine start signal is received that is indicative of an upcoming engine start and information indicative of engine operating characteristics. A SEN signal is generated that is indicative of SEN. A characteristic of the SEN signal is modulated based on the engine start signal to align with a corresponding engine operating characteristic during starting conditions. The adjusted SEN signal, including the modulated characteristic, is provided to a loudspeaker for projecting sound within a vehicle cabin.

In a simplified approach, a frequency of the SEN may be modulated based solely on vehicle speed during engine stop conditions. This approach audibly aides the transition from ICE to EV, during which both the engine RPM and the wheel RPM are monitored. At this transition, the synthetically generated engine orders, to simulate the natural sound of the now-deactivated ICE can be played through the vehicle speakers. As the vehicle accelerates, the wheel rpm can be used in place of the now-deactivated engine RPM signal in order to increase the pitch of the synthesized engine orders to simulate the soundscape that would be present if the ICE were operating. As the vehicle decelerates to a slower speed, the pitches of the synthetic engine orders or synthetic engine noise are shifted down in frequency.

In one or more embodiments, the vehicle system improves the sonic experience of the vehicle's transition between electric mode (EM) and ICE modes, i.e., engine starting conditions. When the ICE reactivates and begins to power the vehicle, it will have a particular RPM, based on the motor controller, the gear selection, and/or vehicle speed. Associated with this particular RPM is a set of engine orders that the ICE will naturally radiate. However, the synthesized engine orders designed to mask the absence of the ICE may not identically match those of the ICE at that time. Therefore, a synthetic gear shift is used to match the pitch of the synthetic engine orders to those of the actual ICE orders at the time of the reactivation of the ICE.

In one or more embodiments, the processor generating the synthetic engine orders can be running the same engine management algorithm that runs in the vehicle. Then, advance notice of the reactivation of the ICE will enable an audible synthetic shift to be generated and played over the vehicle speakers. A non-zero or increasing ICE RPM signal may also be used as the engine start signal. In addition, the target ICE order frequencies and amplitude levels will also be known, and so they can be matched by the synthetic orders in both frequency and amplitude.

In one or more embodiments, the vehicle system employs one or more strategies for synthesizing engine sound during an engine start condition, including: 1) Changing the frequency of one currently-playing synthetic engine order to match the frequency of one engine order upon ICE re-start; 2) Changing both the frequency and amplitude of the SEN to match the ICE noise perceived at the location of a passenger; 3) Changing the frequency of a dominant (an order so loud that it is prominent) synthetic engine order to match a dominant ICE order upon ICE restart; 4) Changing the frequency and amplitude of a dominant synthetic engine order to match; 5) Changing the frequency of multiple engine orders; 6) Changing the frequency and amplitude of multiple orders; 7) Changing the frequency of multiple dominant engine orders; 8 Changing the frequency and amplitude of multiple dominant orders. For the cases of synthetic engine sounds not only consisting of engine orders, the vehicle system may change the WAV file playback rate to adjust the pitch so that a dominant frequency band of the synthetic sound matches a dominant engine order frequency. Certain embodiments change the playback rate so that the frequency matches, and also change the gain to also match the amplitude. In addition, in systems that synthesize additional engine orders or reduce the amplitude of one or more orders while the ICE is operating to augment the sound, change the frequency and/or amplitude of one or more of these synthetic engine orders to match upon engine restart.

In one or more embodiments, the vehicle system may be implemented in a variety of vehicles, including: vehicles with synthetic engine noise generation systems for the passengers that include Continuously Variable Transmissions (CVT), or conventional fixed gear ratio transmissions; Internal Combustion Engine-like (ICE), or not-ICE like synthetic engine noise; Hybrids that synthesize additional engine orders to augment the character of their ICE; Hybrids that reduce the amplitude of one or more engine orders with SEN; and Auto-start stop vehicles that are hybrid, or have a gas/diesel ICE.

In one or more embodiments, synthetic shift refers to: 1) modulating pitch of synthetic engine noise which may be: A) individual sine waves that may mimic the individual engine orders present in the ICE; B) playback rate of modulating synthetic engine noise stored in Wave (.wav) files (or pre-recorded and processed sounds stored in other audio formats); or C) Combinations of A and B. Synthetic shift may also refer to 2) a "canned sound" that is a "pre-recorded" or "pre-synthesized" sound of an ICE gear shift. This pre-processed sound likely must contain one or more decreasing or increasing pitches to mimic the sound of an ICE upshift or downshift, respectively.

In one or more embodiments, the synthetic shift can be generated by modulating the pitch of 1A or 1B above, or by simply playing a stored audio file, such as in method 2. The synthetic shift can be realized by the addition of a processing block within the synthetic engine noise generation system. In the case of 1A, the pre-shift frequency and amplitude of the SEN is known, and the post-shift frequency and amplitude of the ICE engine is also known. The target shift duration is also known. With these inputs and targets, numerous smooth but rapid transitions are possible between these beginning and ending frequencies and amplitudes. In the case of 1B above, the pitch of the engine noise is modulated by changing the playback rate of the .wav file. To create the synthetic shift, the playback rate is changed in a rapid transition to a final playback rate wherein a dominant engine order, multiple engine orders, or a dominant frequency range of the SEN will match a dominant engine order of the ICE upon ICE engine restart.

Generally, for a gearshift in a traditional, fixed gear ratio transmission, the level of engine noise can decrease slightly during the shift, as the torque output of the engine drops during the shift. In one or more embodiments, the vehicle system can optionally mimic this amplitude modulating behavior during the synthetic shift. For example, during an upshift from $1^{st}$ to $2^{nd}$ gear, the engine orders decrease in frequency according to the difference in gear ratios of the transmission, e.g., the $4^{th}$ engine order moving from 100 to 78 Hz. High performance vehicles have gear shifts are shorter in duration than lower performance vehicles. For example, an extremely fast gear shift is 50 ms. A high-performance vehicle may have a gear shift with a duration of 250 ms. An average speed vehicle may have a gear shift of 500 ms. Manual shifts are typically in the range of 500 mS to 1.5 s.

Vehicle system embodiments with imprecision are still useful. For example, if the SEN is lowered in pitch to attempt to match the ICE engine orders upon ICE engine restart, it is not strictly required to match exactly the ICE engine order frequencies. The audible character of the transition between SEN and ICE will still be audibly smoothed if the SEN orders are shifted upward or downward toward the ICE engine restart orders.

DETAILED DESCRIPTION

As required, detailed embodiments are disclosed herein; however, it is to be understood that the disclosed embodiments are merely exemplary and may be embodied in various and alternative forms. The figures are not necessarily to scale; some features may be exaggerated or minimized to show details of particular components. In addition, flow charts are shown that contain a number of steps, and the steps are possible to execute in alternate orders, and in some embodiments, multiple steps are happening concurrently. Therefore, specific structural and functional details disclosed herein are not to be interpreted as limiting, but merely as a representative basis for teaching one skilled in the art.

Figure 1:
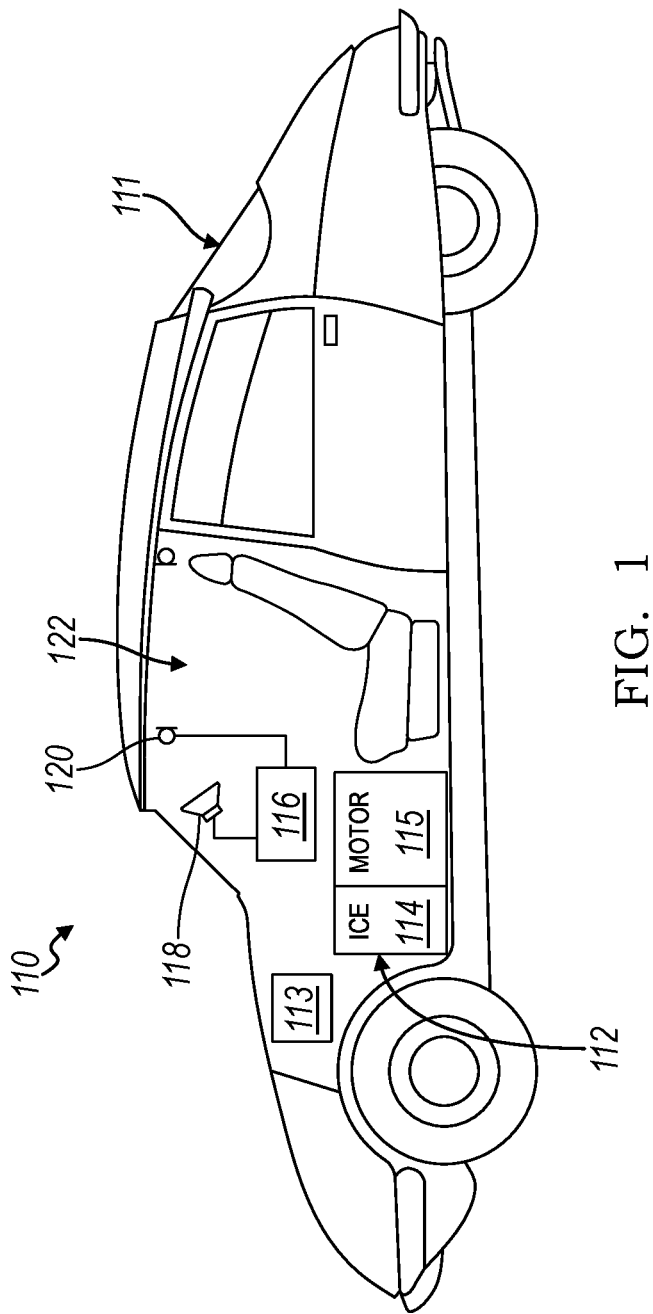
FIG. 1 is a schematic diagram of a vehicle system for synthesizing sound during engine start/stop conditions according to one or more embodiments.

With reference to FIG. 1, a vehicle system for synthesizing sound is illustrated in accordance with one or more embodiments and generally represented by numeral 110. The vehicle system 110 is depicted within a vehicle 111. The vehicle 111 includes a powertrain 112 with a transmission 113, an internal combustion engine (ICE) 114, and an electric motor 115. The vehicle system 110 includes a controller 116, at least one loudspeaker 118, and in certain embodiments, at least one microphone 120.

A driver may expect to hear noise from the powertrain 112 within an interior cabin or passenger compartment 122 of the vehicle 111 during certain driving modes or maneuvers. Such powertrain noise may be reduced or absent in new vehicle architectures and driving modes. The controller 116 communicates with one or more vehicle controllers (not shown) to monitor various vehicle components and systems, such as the powertrain 112 under current driving conditions. The controller 116 generates a synthesized engine noise (SEN) signal that aides the driving experience by providing audible feedback of the vehicle's driving dynamics (e.g., acceleration, cruising, deceleration, reverse, startup, shutdown), which is provided to the loudspeaker 118 and projected as SEN that is audible within the passenger compartment 122. This SEN combines with the actual engine sound to produce the total engine sound heard by the driver. The vehicle system 110 shifts the frequency and/or amplitude of the SEN during engine starting conditions to match the actual engine sound.

Figure 2:
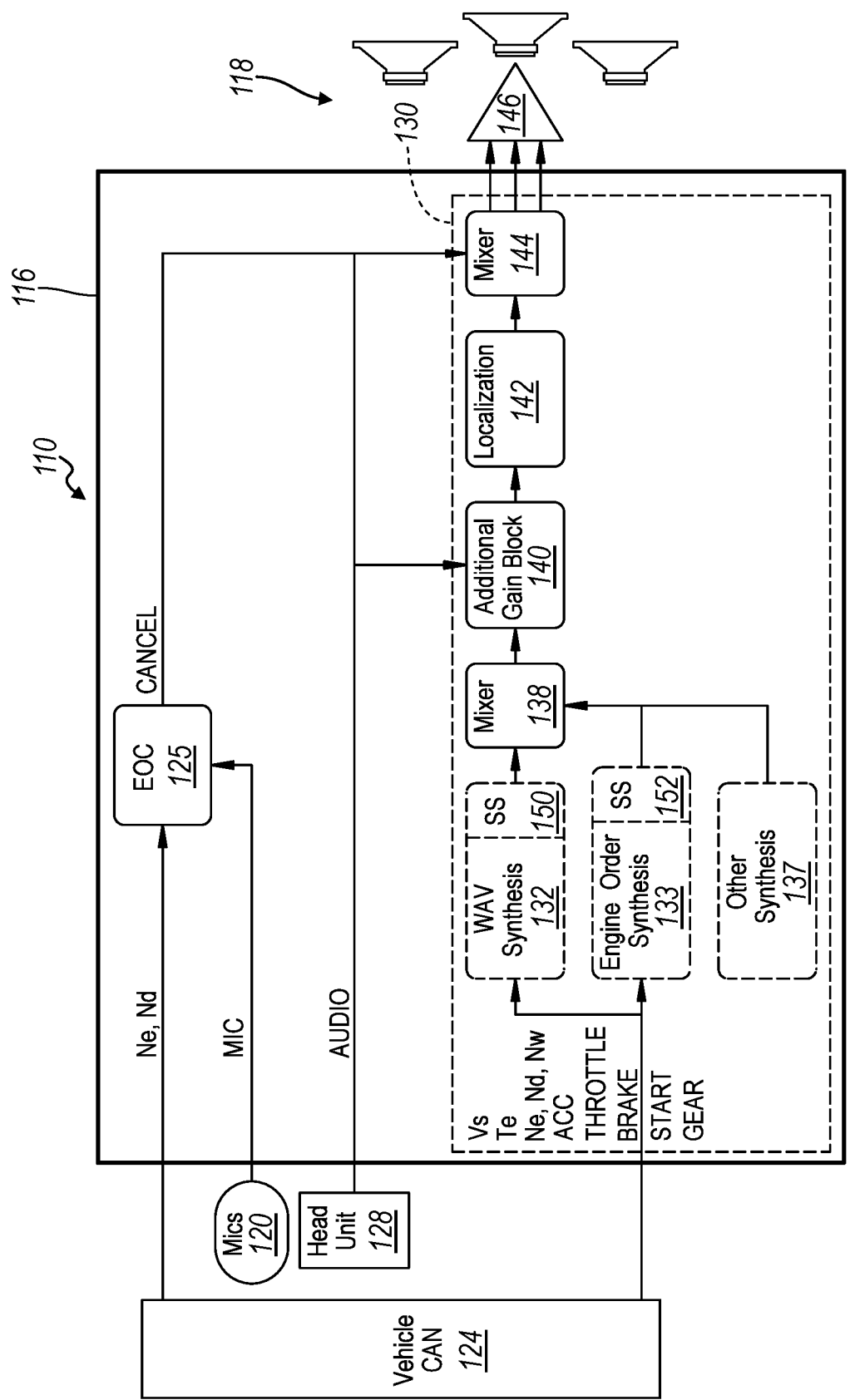
FIG. 2 is a schematic block diagram of the vehicle system of FIG. 1.

Referring to FIGS. 1-2, the controller 116 communicates with other vehicle systems and controllers via one or more vehicle networks by wired or wireless communication. The vehicle network may include a plurality of channels for communication. One channel of the vehicle network may be a serial bus such as a Controller Area Network (CAN) 124. One of the channels of the vehicle network may include an Ethernet network defined by Institute of Electrical and Electronics Engineers (IEEE) 802 family of standards (not shown). Additional channels of the vehicle network may include discrete connections between modules and may include power signals. Different signals may be transferred over different channels of the vehicle network. For example, video signals may be transferred over a high-speed channel (e.g., Ethernet) while guiding signals may be transferred over CAN or discrete signals. The vehicle network may include any hardware and software components that aid in transferring signals and data between modules and controllers.

Although the controller 116 is shown as a single controller, it may contain multiple controllers, or it may be embodied as software code within one or more other controllers. The controller 116 generally includes any number of microprocessors, ASICs, ICs, memory (e.g., FLASH, ROM, RAM, EPROM and/or EEPROM) and software code to co-act with one another to perform a series of operations. The controller 116 includes predetermined data, or "look up tables" that are stored within the memory, according to one or more embodiments.

The controller 116 includes an Engine Order Cancellation (EOC) module 125 according to one or more embodiments. The EOC module 125 cancels or reduces engine sound. The controller 116 receives one or more microphone signals, (MIC) that represents cabin engine sound measured within the passenger compartment 122. In one or more embodiments, the vehicle 111 includes four microphones 120 that are mounted at different locations within the passenger compartment 122, and the controller 116 receives four corresponding MIC signals. The controller 116 also receives signals that represent the rotational speed of the engine (Ne) and the rotational speed of the drive shaft (Nd). Using these signals (MIC, and Ne or Nd), the EOC module 125 generates a signal (CANCEL) to cancel or reduce specific engine orders, as perceived at specific locations within the passenger compartment 122, e.g., near the ears of the driver.

The vehicle 111 includes a vehicle audio system that includes the controller 116, the loudspeaker(s) 118, the microphones 120, and a head unit 128. The controller 116 receives audio signals (AUDIO) from the head unit 128. Like the controller 116, the head unit 128 generally includes any number of microprocessors, ASICs, ICs, memory (e.g., FLASH, ROM, RAM, EPROM and/or EEPROM) and software code to co-act with other controllers to perform a series of operations. The controller 116 includes a SEN module 130 for generating synthetic engine sound or noise. The SEN module 130 receives numerous guiding signals from the CAN bus 124, such as vehicle speed (VS), engine torque (Te), engine speed (Ne), drive shaft speed (Nd), wheel speed (Nw), and throttle (THROTTLE) position. The controller 116 illustrated in FIG. 2 receives multiple guiding signals, however alternate embodiments of the vehicle system 110 contemplate the controller 116 receiving fewer, alternate and/or additional guiding signals. In one or more embodiments the controller 116 is embodied as software code and/or hardware within the head unit 128 or other component of the vehicle audio system, e.g., loudspeakers 118 or amplifiers.

In one or more embodiments, the SEN module 130 includes a WAV Synthesis block 132 that plays back a filtered, modified, or augmented audio bitstream that is generated from a Waveform (WAV) Audio File and represents synthetic engine sound or synthetic engine noise. In one or more embodiments, the WAV Synthesis block 132 generates the audio bitstream. The WAV Synthesis block 132 also includes features for modulating the characteristics of the audio bitstream, e.g., playback rate, frequency dependent filtering, and/or amplitude. In one or more embodiments, the SEN module 130 also includes an Engine Order Synthesis block 133 that generates one or more engine order signals based on, for example, engine order frequencies and levels found in lookup tables for the engine speed, drive shaft speed or vehicle speed. The WAV Synthesis block 132 may store the audio data in various formats, including: pulse-code modulation (PCM), open container format (e.g., OGG), moving picture experts group layer-3 (MP3), audio interchange file format (AIFF), etc.

The SEN module 130 includes a Mixer block 138 that combines the output of the WAV Synthesis block 132 and the Engine Order Synthesis block 133. Other embodiments of the vehicle system 110 contemplate additional and/or alternative synthesis module(s) 137 for synthesizing other sound (e.g., cloud-based sounds, over-the-air (OTA) updated sounds, cloud-based algorithms wired or wirelessly externally connected models, etc.).

In some embodiments, the SEN module 130 also includes an Additional Gain Block (AGB) 140 for adjusting, e.g., amplifying or attenuating, the signal(s) from the WAV Synthesis block 132 and/or the Engine Order Synthesis block 133 based on one or more signals, e.g., CAN based or guiding signals. The gain is expressed using the logarithmic decibel (dB) units. A gain of 1 corresponds to zero dB and represents a pass-through condition where the AGB 140 passes SEN without modification. A gain greater than one (positive dB) refers to amplification, and a gain less than one (negative dB) refers to reduction. In one or more embodiments, the AGB 140 includes multiple Additional Gain Blocks that each address the Gain for a predetermined frequency band, or engine order.

In some embodiments, the SEN module 130 includes a Localization block 142 that receives the audio signal from the AGB 140 and generates a sound image of where the engine would typically be located relative to the loudspeakers 118. The localization block 142 creates an illusion to the listeners that the synthetic engine sound is emanating from the engine compartment, and not from the loudspeakers 118. For example, in one or more embodiments, the Localization block 142 generates a sound image for the SEN that corresponds to a location three to four feet forward of a loudspeaker 118 located in a headrest of a driver seat.

The SEN module 130 includes a Mixer 144 for combining the localized SEN output of the Localization block 142, with the CANCEL and AUDIO signals. The controller 116 provides the combined output signal(s) to one or more power amplifiers 146, which in turn provides amplified SEN signals to the loudspeakers 118. The vehicle system 110 plays the amplified combined output signals through the vehicle loudspeakers 118 to provide the vehicle occupants, especially the driver, real time audible feedback of the vehicle's operating state.

The vehicle system 110 is applicable to vehicles 111 having different powertrains 112. In one or more embodiments, the vehicle 111 is a conventional vehicle with a powertrain 112 that includes a four-cylinder internal combustion engine 114. Such four-cylinder engines naturally radiate certain engine orders—mainly the 2nd, 4th, 6th, and 8th orders of the engine output shaft rotational speed. The vehicle system 110 synthesizes additional engine orders: 2.5, 4.5, 6.5, e.g., using the Engine Order Synthesis block 133, to add a racier character to the engine's sound signature.

Engine orders are defined by the engine's cycle type and number of cylinders. For example, most internal combustion engines (ICE) use a four-stroke cycle that includes intake, compression, power/combustion and exhaust strokes. The engine includes a piston that is coupled to a crankshaft. The piston translates up and down within a cylinder while driving (rotating) the crankshaft. Each stroke up and down is one revolution of the crankshaft. Therefore, two revolutions of the crankshaft are required for all four strokes to occur. The combustion stroke generates the loudest acoustic response, and there is one combustion event every two rotations of the crankshaft. A four-cylinder four stroke ICE generates a dominant order of 2, because four (cylinders) times ½ is equal to two; and a six-cylinder four stroke ICE generates a dominant order of 3, because six (cylinders) times ½ is equal to three.

In another embodiment, the vehicle 111 is a hybrid, or an auto-start stop vehicle, with a powertrain 112 that includes an engine 114 that is controlled to stop or shut-off when the vehicle stops for a short period of time, e.g., at a traffic light, and then restart to provide propulsion. This start/stop technology is employed to increase fuel efficiency. The vehicle system 110 generates SEN to remove or mask the abrupt audible transition when the engine turns off or restarts using various combinations of the Engine Order Synthesis block 133 and the WAV Synthesis block 132. Upon engine turn off, the level of this SEN set by the AGB 140 is determined by the signal processing module 126 in order to match the sound pressure level, or perceived loudness, of the engine just prior to when it is shut off. This may include matching the level or loudness of one or more individual engine orders. This may include a calculation, performed by signal processing module 126, of the Signal to Noise Ratio (SNR), Sound Pressure Level (SPL), or perceived loudness of one or more individual engine orders and adjusting the AGB 140 to substantially match the SEN level of one or more engine orders after the engine has turned off. This calculation of the SNR, SPL or perceived loudness by the signal processing module 126 may be intermittent, continuous, or may be performed just prior to engine shut off. Upon ICE turn on, the frequency of one or more SEN engine orders may be modulated to match the frequency of one or more ICE engine orders. Further, the amplitude of one or more SEN engine orders may be modulated to match the amplitude of one or more ICE engine orders upon ICE turn on. In various embodiments, by amplitude, it is understood that other closely related quantities, such as SPL, perceived loudness or SNR can be substituted, and so are within the scope of this invention. In additional embodiments, the WAV Synthesis block 132 is used to create SEN while the ICE is deactivated. Upon ICE restart, the SEN generated by 132 can be modulated in either frequency or amplitude or both, in order to match that of the ICE.

In certain embodiments, for both hybrid or auto-start stop ICE vehicles, the engine order synthesis block 133 synthesizes certain harmonics while the ICE is operating, and then when the ICE is shut off, synthesizes one or more additional engine orders to replace those that are no longer being created and radiated by the vehicle's powertrain 112. When the ICE is shut off, block 133 generates additional engine orders to closely replicate the sonic signature that the ICE had produced at the location of one or more passenger's ears. This may include matching individual engine orders, and also between order noise or noises. This may include replicating the sonic signature in one or more frequency bands. In one embodiment, upon ICE turn on, the frequency of one or more SEN engine orders may be modulated to match the frequency of one or more SEN engine orders that are played during ICE operation and function to augment the sonic character of the ICE when it operates. Further, the amplitude of one or more SEN engine orders may be modulated to match the amplitude of one or more SEN engine orders that are played during ICE operation.

In yet another embodiment, the vehicle 111 is a hybrid electric vehicle (HEV) with a powertrain 112 that includes both the engine 114 and the electric motor 115 that are controlled, alone or in combination, to propel the vehicle. The vehicle system 110 generates SEN, using the SEN module 130, when the HEV 111 is operating in electric mode, i.e., the electric motor 115 alone is operated for propulsion in order to provide the audible engine sound signature of a gasoline powered engine that the driver and vehicle occupants may be more accustomed to. This added sound aides the driving experience by providing audible feedback of the vehicle's driving dynamics (e.g., acceleration, cruising, and deceleration, reverse, startup, shutdown, etc.). Fully electric vehicles, and HEVs operating in EV mode, have an internal soundscape that consists primarily of vehicle suspension noise, vibration and harness (NVH) and electric motor whine, the latter of which is harmonically sparse. Often the sound signature of motor whine is viewed as undesirable, due both to its high frequency nature, and the lack of harmonic complexity.

In other embodiments, the vehicle system 110 modifies or reduces the audible character of the ICE sound signature. In this case, the vehicle system 110 reduces the audible level of the engine 114 and/or the electric motor 115 using the engine order cancellation (EOC) module 125. This EOC module 125 reduces the overall level of individual engine orders, and therefore reduces the total level of engine noise in the passenger compartment 122 at the locations of the vehicle occupants. Then, a SEN may be played through the loudspeakers 118, and the original sound at the locations of the passengers' ears may be effectively, then indirectly, replaced, or masked, by that of the SEN. By first dramatically reducing the level of the actual engine noise at the locations of the passengers' ears, the overall sound pressure level including the contribution of the SEN at the location of the passenger's ears is lower than it otherwise would be without employing the EOC system. The presence or absence of an EOC system changes background noise level, and so it requires a different SEN level, therefore it is often desirable to reduce the overall noise in the cabin before the SEN is applied. In certain embodiments, the amplitude of one or more SEN engine orders may be modulated to match the amplitude of one or more IC engine orders that will be present upon ICE restart in the passenger cabin while the EOC module 125 is functioning. In additional embodiments, the WAV Synthesis block 132 is used to create SEN while the ICE is deactivated. Upon ICE restart, the SEN generated by 132 can be modulated in either frequency or amplitude or both, in order to match that of the ICE with the EOC module functioning.

As previously mentioned, SEN generation systems coupled with EOC systems have the capability to mask existing engine sound with more desirable synthesized engine-like sounds and or to enhance existing engine sounds to play in the passenger compartment 122 of the vehicle 111. Most of the synthesized engine sounds in these systems are tuned using one or more reference CAN signals such as vehicle speed (VS), throttle or accelerator pedal position (ACC), engine torque (Te), in order to naturally integrate these sounds into the vehicle.

In an EV or HEV, the vehicle system 110 synthesizes engine-like sounds, i.e., SEN, and plays it through the loudspeakers 118 to provide a more traditional engine start up and driving vehicle experience. The SEN may be of any sonic character and need not mimic an engine. In one or more embodiments, the SEN resembles sounds that are not typical of an automotive engine, e.g., a jet engine for an aircraft. This SEN may start when the vehicle's power button (not shown) is pressed and helps provide an audible feedback to the driver that the vehicle is powered on. This SEN continues to be played through the loudspeakers 118 to give the driver audible feedback as to the state of the vehicle—whether at idle, accelerating, decelerating, or just cruising.

Often, a goal of creating SEN is to provide the vehicle's driver a form of audible feedback of the vehicle's current operating state. For example, with hybrid vehicles operating in electric mode, there is no engine idle sound. That is, the powertrain of the vehicle is completely silent when the wheels are not turning. The driver, therefore, has no audible indication that the vehicle is powered on, even if the transmission is in drive and not park. In the case of vehicle acceleration, the vehicle's driver is accustomed to the amplitude of the engine noise increasing as the vehicle speed increases, as is the behavior of an ICE. The vehicle's driver is also accustomed to the amplitude and frequency of the engine noise increasing as the accelerator pedal is depressed with the transmission in the neutral position. To mimic this behavior with SEN, the accelerator pedal position (ACC) and/or the engine torque (Te) are used, by at least one of the WAV Synthesis block 132 and the Engine Order Synthesis block 133, as guiding signals to increase the frequency and/or amplitude of the synthetic engine sound. Other embodiments of the vehicle system 110 contemplate alternate synthesis blocks. Drivers are also accustomed to the pitch of the engine orders increasing as the vehicle speed increases, as is also the behavior of an ICE. To mimic this behavior, the engine shaft rotational speed (Ne), wheel speed, or vehicle speed (Vs) is used as a guiding signals to the WAV Synthesis block 132 and the Engine Order Synthesis block 133 of the SEN module 130 to adjust the pitch or frequency of the synthetic engine orders or SEN.

With reference to FIGS. 3-6, the vehicle system 110 includes one or more algorithms or methods for synthesizing sound during engine start conditions. The methods are implemented using software code contained with the controller 116 according to one or more embodiments. While the methods are described using flowcharts that are illustrated with a number of sequential steps, one or more steps may be omitted and/or executed in another manner in one or more other embodiments.

Figure 3:
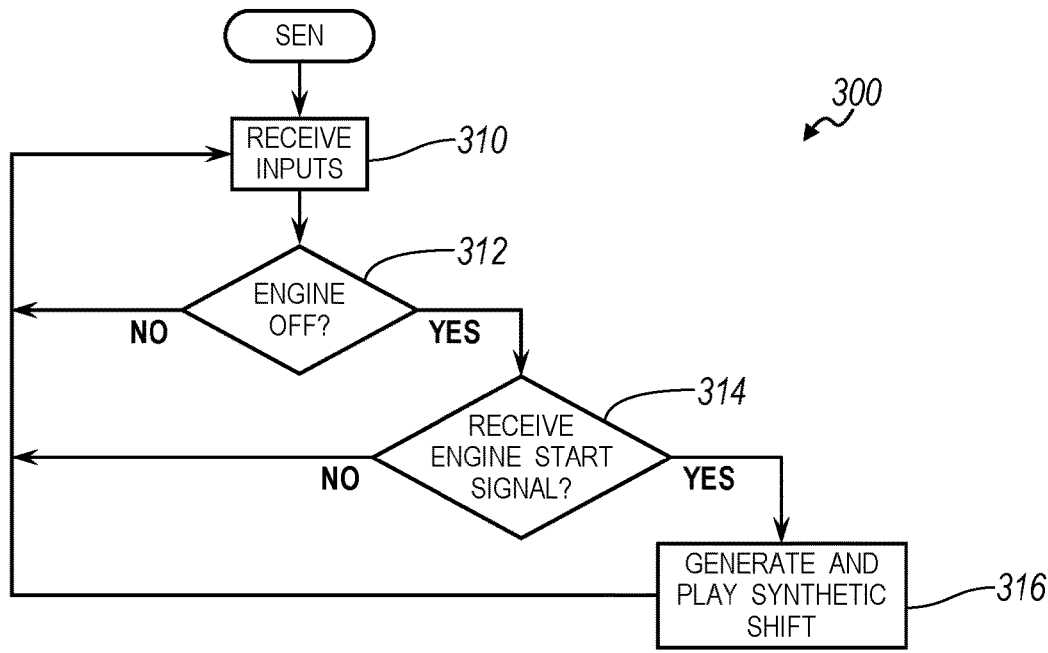
FIG. 3 is a flow chart illustrating a method for synthesizing sound during engine start conditions according to one embodiment.

With reference to FIG. 3, a method for synthesizing sound during an engine start condition is illustrated according to one or more embodiments and generally referenced by numeral 300. At step 310 the vehicle system 110, while generating SEN, receives input that is indicative of vehicle speed (Vs) including engine speed (Ne) or drive shaft speed (Nd), and a gear selection or setting (GEAR). In one or more embodiments, the vehicle system 110 also receives an engine start command signal (START) at step 310. At step 312 the vehicle system 110 determines if the engine is off. In one embodiment, the vehicle system 110 determines that the engine is off based on engine speed (Ne) being below a threshold speed, or at rest (e.g., zero rpm). If the vehicle system 110 determines that the engine is on, i.e., not off, it returns to step 310. If the engine is off, the vehicle system 110 proceeds to step 314.

At step 314 the vehicle system 110 determines if the vehicle is preparing to start the engine 114. In one embodiment, the vehicle system 110 receives the engine start signal (START) prior to the vehicle starting the engine, along with information indicative of a timer duration between receipt of START and actual engine start. In other embodiments, the vehicle system 110 determines that the engine 114 is about to be started based on a change in engine speed (Ne) or engine torque (Te) that corresponds to engine cranking conditions (e.g., Ne rapidly increasing from zero rpm). In one or more embodiments, the vehicle system 110 generates the engine start command signal (START), because it is running the same engine management algorithm that runs in the vehicle, and the vehicle is about to start the engine. If the vehicle system 110 does not detect an engine starting sequence at step 314, it returns to step 310. If the vehicle system 110 detects an engine starting sequence at step 314, it proceeds to step 316.

At step 316, the vehicle system 110 modifies or shifts the synthesized engine sound during the engine starting condition. The vehicle system 110 employs one or more strategies for shifting the synthesized engine sound during an engine start condition by: changing the frequency and/or amplitude of the SEN in one or more orders to match the corresponding frequency and/or amplitude of a conventional engine during re-start; playing pre-determined and processed sounds stored in memory (e.g., the WAV synthesis block 132); or playing a "canned sound" that is a "pre-recorded" sound of an ICE gear shift when coupled to a fixed gear transmission 113.

Figure 4:
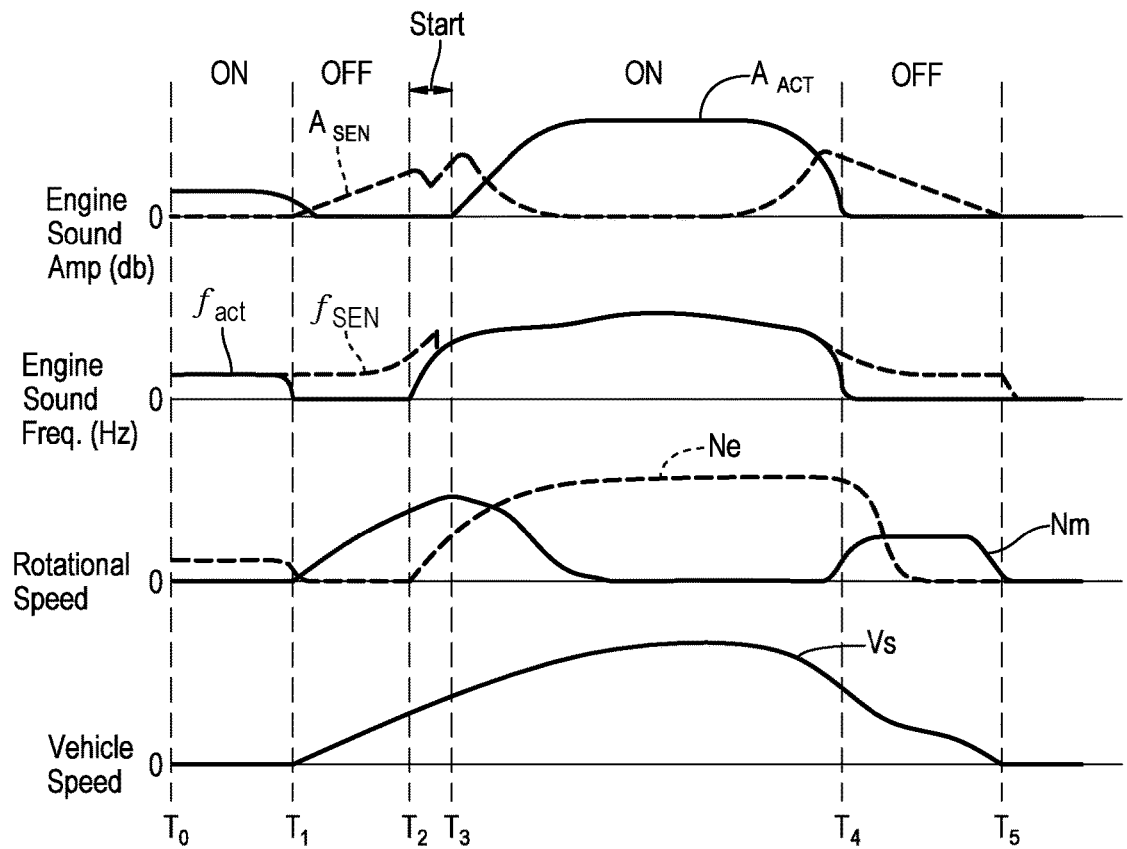
FIG. 4 includes four graphs illustrating how various parameters of the vehicle system of FIG. 1 change over time due to the method of FIG. 3.

FIG. 4 illustrates an example of the impact of the method 300 for synthesizing sound during engine starting conditions. FIG. 4 includes four graphs of data taken along a common period of time. A first graph illustrates the engine sound amplitude, including the actual engine sound ($A_{ACT}$) in solid line along with the SEN ($A_{SEN}$) in dashed line. The second graph illustrates the engine sound frequency, including the actual engine sound ($f_{ACT}$) in solid line along with the SEN ($f_{SEN}$) in dashed line. The third graph illustrates the rotational speed of the engine (Ne) and the rotational speed of the electric motor (Nm). And the fourth graph illustrates the vehicle speed (Vs).

At time T0, the engine is on, as indicated by a positive Ne, but the vehicle is not moving, as indicated by a Vs of zero. At time T1, the engine is off (Ne is zero), and the vehicle starts moving in EV mode, as indicated by an increasing Vs and Nm. At time T2, the vehicle begins an engine start or cranking sequence, as indicated by an increasing Ne, which is completed at time T3. At time T4, the engine is turned off (Ne decreases rapidly) and the vehicle is again operated in EV mode. Then at time T5 the vehicle is stopped with the engine off, as indicated by both Vs and Ne of zero. The vehicle system 110 employs one or more strategies for synthesizing engine sound during an engine start condition, as indicated by SEN ($A_{SEN}$, $f_{SEN}$) between T2 and T3.

Figure 5:
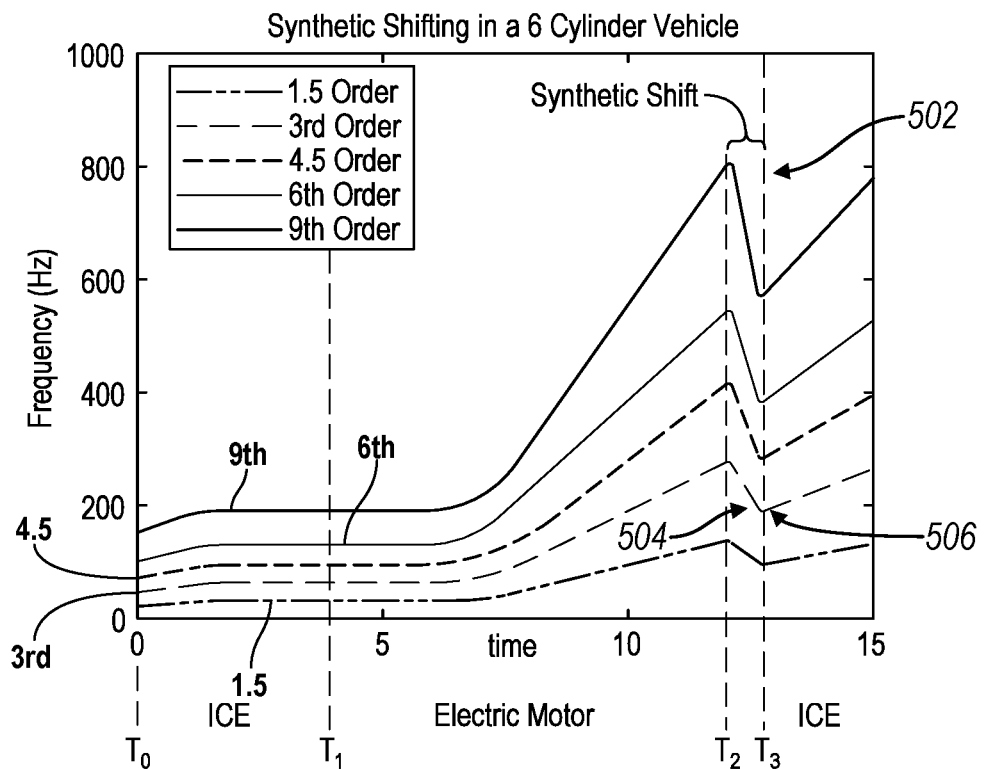
FIG. 5 is an enlarged and expanded view of a portion of the second graph of FIG. 4.

FIG. 5 is an alternate view of a portion of FIG. 4, illustrating the engine sound frequency, including the actual engine sound ($f_{ACT}$) in solid line along with the SEN ($f_{SEN}$) in dashed line. FIG. 4 includes the $f_{ACT}$ and $f_{SEN}$ of a single order, however FIG. 5 illustrates multiple engine orders.

In one or more embodiments, the engine 114 depicted in FIG. 5 is a four stroke, six cylinder ICE, that includes a dominant $3^{rd}$ Order. FIG. 5 also includes other dominant orders of the engine 114 including a 1.5 Order, a 4.5 Order, a $6^{th}$ Order, and a $9^{th}$ Order.

In various embodiments, the vehicle system 110 synthesizes and plays engine sound during an engine start condition, as described with reference to step 316 by 1) modulating the SEN to match the frequency and/or amplitude of one or more engine orders; 2) playing a predetermined shift sound at an appropriate rate; 3) playing pre-determined and processed sounds stored in memory (e.g., the WAV synthesis block 132); and/or 4) reducing the amplitude of SEN to mimic the magnitude response of a real fixed gear transmission gear shift during a relatively short period of time (e.g., 250 ms).

The vehicle system 110 includes a SEN module 130 (FIG. 2) with an Engine Order Synthesis block 133 that generates one or more engine order signals based on, for example, engine order frequencies and levels found in lookup tables for the engine speed (Ne), drive shaft speed (Nd), accelerator pedal position (ACC), or vehicle speed (Vs). The vehicle system 110 audibly aides the engine stop transition at time T1, during which both Ne and Nd are monitored. At this transition, the synthetically generated engine orders simulate the natural sound of the now-deactivated ICE 114, and can be played through the vehicle speakers 118. As the vehicle 111 accelerates, the Nd signal can be used in place of the Ne signal of the now-deactivated engine 114 in order to increase the pitch of the synthesized engine orders to simulate the soundscape that would be present if the ICE 114 were operating.

In certain embodiments, the vehicle system 110 improves the sonic experience of the vehicle's engine start transition at time T3 by shifting the SEN, as described with reference to step 316 of FIG. 3. When the ICE 114 reactivates and begins to power the vehicle, it will have a particular speed (Ne), based on the motor controller, the gear selection, and vehicle speed. Associated with this particular Ne is a set of engine orders that the ICE 114 will naturally radiate. However, the synthesized engine orders are designed to mask the absence of the ICE 114, and may not identically match the actual ICE sound at that time. Therefore, the vehicle system 110 references predetermined data, maps, or look-up tables that includes this engine information and uses a synthetic shift to match the pitch of one or more synthetic engine orders to those of the actual ICE orders at the time of the reactivation of the ICE.

As described with reference to step 314 of FIG. 3, the controller 116 receives an engine start signal (START) prior to the engine starting. Alternatively, the controller 116 may be running the same engine management algorithm that runs in the vehicle, which allows the controller 116 to generate START itself. The vehicle system 110 uses this advance notice of the reactivation of the ICE 114 to enable an audible synthetic shift to be generated and played over the vehicle speakers 118. In addition, the frequency and level of one or more ICE orders will also be known based on predetermined data, and so they can be matched by the synthetic orders in both frequency and amplitude as referenced by numeral 502.

The vehicle system employs one or more strategies for shifting SEN during an engine start condition. In one or more embodiments, the vehicle system 110 adjusts the frequency of one currently-playing synthetic engine order, e.g., dominant order 3, as referenced by numeral 504, to match the frequency of one actual engine order upon ICE re-start, as referenced by numeral 506. As illustrated by FIG. 5, the difference in frequency between the SEN at 504 and the actual engine sound at 506 is relatively large and the vehicle system 110 controls the SEN to shift downward approximately 75 Hz over a duration of 100 ms, or between time T2 and T3. In one embodiment, the vehicle system 110 controls the SEN to shift rapidly, i.e., at a rate of decrease of approximately 100-700 Hz/s, as shown by orders 3, 4.5, 6 and 9 in FIG. 5. In other embodiments, the vehicle system 110 shifts the SEN more gradually, at a rate of decrease of less than 100 Hz/s. The rate of decrease may be application specific and based on the lead time of the engine start signal (START). For example, the rate of decrease may be higher for higher engine orders.

In other embodiments, the vehicle system 110 controls both the frequency and amplitude of the SEN to match the actual ICE noise during an engine start condition, as shown by graphs 1 and 2 of FIG. 4 at time period T2-T3. In other embodiments, the vehicle system 110 changes the frequency, or the frequency and amplitude of the SEN of one or more engine orders during an engine start condition.

The vehicle system 110 includes a SEN module 130 (FIG. 2) that includes a WAV Synthesis block 132 that plays back a filtered, modified, or augmented audio bitstream that is generated from a Waveform (WAV) Audio File and represents synthetic engine sound or synthetic engine noise. In one or more embodiments, the WAV Synthesis block 132 may change the playback rate to adjust the pitch so a dominant frequency band of the synthetic sound matches a dominant engine order frequency, and/or change playback rate and gain so that both frequency and amplitude matches a dominant engine order.

Figure 6:
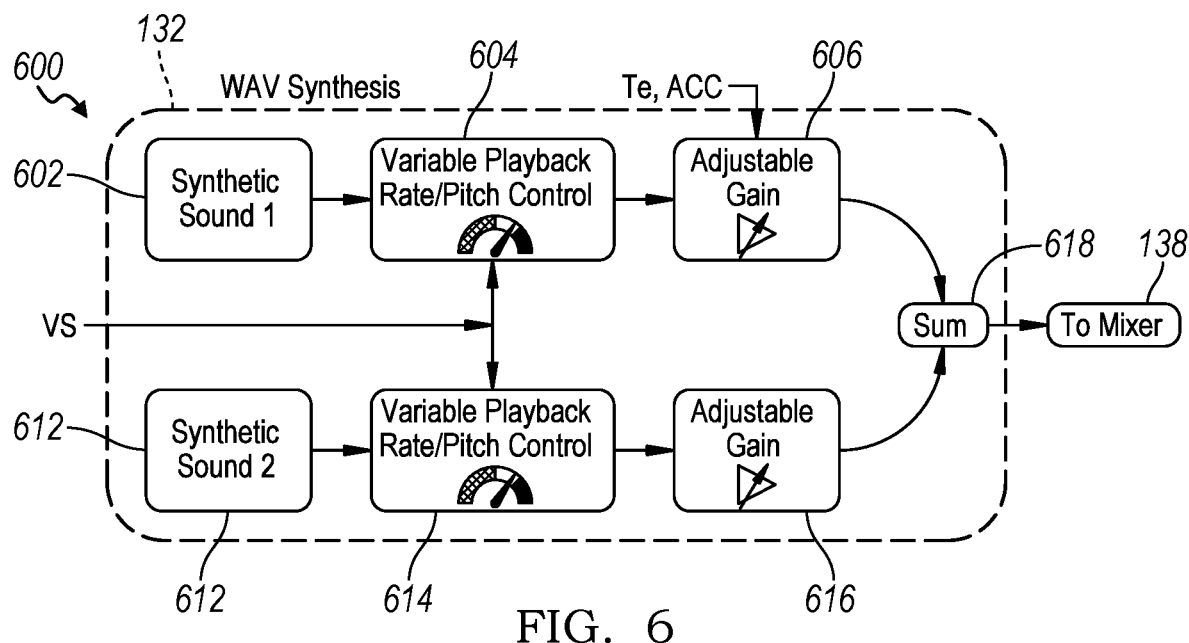
FIG. 6 is a schematic block diagram of a portion the vehicle system of FIG. 2.

FIG. 6 is a detailed view of the WAV Synthesis block 132 of FIG. 2, according to one or more embodiments. The WAV Synthesis block 132 includes a process 600 for modulating sound using multiple audio files and/or multiple versions of an audio file mixed together. The process 600 includes inputting a first synthetic sound signal 602 to a first variable playback rate and/or pitch control module 604, where the playback rate and/or pitch control module accepts vehicle speed (VS) signal, or another vehicle operating parameter related to vehicle speed (e.g., Ne, Nd, Nw) to adjust the rate and/or pitch control applied to the first synthetic sound signal 602. For example, a playback rate and/or pitch of the input synthetic sound signal may increase with increasing VS. However, it is to be understood that any suitable relationship between VS and playback rate/pitch adjustment may be utilized to simulate changes in engine sound (or other simulated sounds, such as simulated sounds of other types of engines) responsive to changes in VS.

In one or more embodiments, the synthetic sound signal, as adjusted by playback rate/pitch control modules 604, is then passed to the adjustable gain modules 606. The adjustable gain module 606 receives signals indicative of engine torque (Te) and/or pedal input (ACC) indicating a driver-requested acceleration to control the amount of gain applied to the filtered synthetic sound signal. For example, a gain applied to the modulated sound signals may increase with increasing Te/ACC. As a more detailed example, the gain applied to the modulated synthetic sound signals may increase linearly with a linear increase in Te/ACC. The Te/ACC signals may be received directly from a sensor and/or from a processing device or module. In some embodiments, the gain 606 may be momentarily lowered to simulate the sound of a real gear shift upon engine start.

In some examples, one or more additional synthetic sound signals (e.g., additional audio files for synthetic sounds) may be input to one or more additional variable playback rate/pitch control modules. For example, FIG. 6 shows a second synthetic sound signal 612 input to a second playback rate/pitch control modulate 614. The second synthetic sound signal 612 may be different from the first synthetic sound signal 602 (e.g., the second synthetic sound signal may represent a different type of sound). For example, the first synthetic sound signal may represent a simulated combustion engine while the second synthetic sound signal may represent a white noise sound. As another example, the first synthetic sound signal may represent a simulation of an engine of a road vehicle while the second synthetic sound signal may represent a simulation of a sound of a jet engine of a rocket. In other examples, the second synthetic sound signal 612 may be derived from the first synthetic sound signal 602. For example, the second synthetic sound signal may be a distorted version of the first synthetic sound signal.

The variable playback rate/pitch control modules 604, 614 may be the same as one another. In other embodiments, the playback rate/pitch control modules may be different for each synthetic sound signal input. In this way, an adjustment to playback rate and/or pitch may be tailored for each synthetic sound signal.

The vehicle speed (VS) may be received at the playback rate/pitch controls 604, 614 directly from an associated sensor or calculated indirectly and received from a processing device/module. The playback rate/pitch adjustment module may include hardware elements and/or may be implemented using a processing device (e.g., controller 116 of FIG. 2) to execute instructions (e.g., SEN module 130 of FIG. 2) for modulating sound signals according to the parameters of the playback rate/pitch control modules.

In one or more embodiments, the second synthetic sound signal, as adjusted by the second playback rate/pitch control module 614, is then passed to the second adjustable gain modules 616. The second adjustable gain module 616 receives signals indicative of engine torque (Te) and/or pedal input (ACC) indicating a driver-requested acceleration to control the amount of gain applied to the filtered synthetic sound signal. In some embodiments, the gain 616 may be lowered for a duration of time, e.g., 50 to 250 ms, to simulate the sound of a gear shift upon engine restart.

The adjustable gain modules 606, 616 may be different from one another (e.g., have a different mapping of Te/ACC to the amount of gain applied) in some examples. In other examples, the adjustable gain modules may be the same as one another (e.g., have a same mapping of Te/ACC to the amount of gain applied). The output of the adjustable gain modules 606, 616 may be combined in a summing module 618 to produce a combined synthetic sound signal. The combined synthetic sound signal may be output directly to the mixer 138 or directly to the amplifier 146.

The vehicle system may be implemented in vehicles having a variety of different transmissions 113. For example, the transmission 113 may include a Continuously Variable Transmissions (CVT), or a conventional fixed gear ratio transmission.

The vehicle system 110 uses a synthetic shift for 1) modulating the pitch of SEN using: A) individual sine waves that may mimic the individual engine orders present in the ICE (e.g., the engine order synthesis block 133); B) predetermined and processed sounds stored in memory (e.g., the WAV synthesis block 132); or C) Combinations of A and B. Synthetic shift may also refer to 2) a "canned sound" that is a "pre-recorded" or "pre-synthesized" sound of an ICE gear shift when coupled to a fixed gear transmission 113. This pre-processed sound may contain one or more decreasing or increasing pitches to mimic the sound of an ICE upshift or downshift, respectively.

In one or more embodiments, the SEN module 130 includes a synthetic shift processing block 150, 152 within the WAV synthesis block 132 and the engine order synthesis block 133, as shown in FIG. 2. In the case of engine order synthesis (1A), the pre-shift frequency and amplitude of the SEN is known, and the post-shift frequency and amplitude of the ICE engine is also known. The target shift duration is also known. With these inputs and targets, numerous smooth but rapid transitions are possible between these beginning and ending frequencies and amplitudes.

In the case of the WAV synthesis (1B above), the pitch of the engine noise is modulated by changing the playback rate of the .wav file. To create the synthetic shift, the playback rate is changed in a rapid transition to a final playback rate wherein a dominant engine order, multiple engine orders, or a dominant frequency range of the SEN will match a dominant engine order of the ICE upon ICE engine restart. In some embodiments, the amplitude of the dominant engine order, multiple engine orders, or dominant frequency range, will also match.

Generally, for a gearshift in a traditional fixed gear ratio transmission, the level of engine noise can decrease slightly during the shift, as the torque output of the engine drops during the shift. The vehicle system 110 can optionally mimic this amplitude modulating behavior during the synthetic shift. For an upshift, for example, from $1^{st}$ to $2^{nd}$ gear, the engine orders decrease in frequency according to the difference in gear ratios of the transmission. The $4^{th}$ engine order moving from approximately 100 to 78 Hz. For example, generally, high performance vehicles have fast gear shifts that are shorter in duration than lower performance vehicles. For example, an extremely fast gear shift is 50 ms. A high-performance vehicle may have a gear shift with a duration of 250 ms. An average speed vehicle may have a gear shift of 500 ms. And manual shifts are typically in the range of 500 mS to 1.5 s.

In an embodiment it may be useful to synthesize additional harmonics of the electric motor of a hybrid vehicle to generate synthetic motor noise (SMN). These additional harmonics of the motor rotational speed may be of a higher or a lower frequency than the naturally generated acoustic output of the motor. These additional synthesized harmonics are to be played out of the speaker or speakers disposed about the passenger cabin in the same manner as the ICE SEN. Aforementioned embodiments have described how ICE SEN can easily be generated to match that of the ICE as it deactivates, but the ICE SEN orders will likely not match the frequency or amplitude of the ICE noise as it reactivates without the use of a synthetic shift. In a useful embodiment, EV SMN is generated to match that of the EV as it deactivates, but EV SMN orders will likely not match the frequency or amplitude of the EV as it reactivates without the use of a synthetic shift. In an embodiment, one or more of the frequency and amplitude of one or more orders of EV SMN are modulated to match those of the reactivating motor upon receipt of an EV motor start command. In an embodiment, one or more characteristics of the EV motor SMN are modulated to align with a corresponding predetermined motor operating characteristic during starting conditions in response to the motor start command.

The embodiments of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices may be configured to execute a computer-program that is embodied in a non-transitory computer readable medium that is programmed to perform any number of the functions as disclosed.

While exemplary embodiments are described above, it is not intended that these embodiments describe all possible forms. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. A vehicle sound synthesis system comprising:
   a loudspeaker to project sound indicative of synthesized engine noise (SEN) within a cabin of a vehicle in response to receiving a SEN signal; and
   a controller programmed to:
      generate the SEN signal;
      receive a first input indicative of an engine start command;
      modulate a characteristic of the SEN signal to align with a corresponding predetermined engine operating characteristic during starting conditions while the vehicle is propelled by an electric motor in response to the engine start command; and
      provide an adjusted SEN signal including the modulated characteristic to the loudspeaker.

2. The vehicle sound synthesis system of claim 1, wherein the characteristic of the SEN signal includes at least one of an amplitude and a frequency.

3. The vehicle sound synthesis system of claim 1, wherein the SEN signal is indicative of at least one engine order.

4. The vehicle sound synthesis system of claim 1, wherein the controller is further programmed to:
   generate the SEN signal based on at least one audio file; and
   modulate a frequency characteristic of the SEN signal by adjusting a playback rate of the at least one audio file.

5. The vehicle sound synthesis system of claim 1, wherein the controller is further programmed to:
   generate the SEN signal based on at least one audio file; and
   modulate an amplitude characteristic of the SEN signal by adjusting a gain of the at least one audio file.

6. The vehicle sound synthesis system of claim 1, wherein the controller is further programmed to:
   receive a second input indicative of a gear transition and pre-recorded engine sound during a transition between a first gear and a second gear; and
   modify the characteristic of the SEN signal by playing the pre-recorded engine sound in response to the gear transition indicating a change between the first gear and the second gear.

7. The vehicle sound synthesis system of claim 6, wherein the first gear is larger than the second gear and the gear transition is indicative of a downshift.

8. The vehicle sound synthesis system of claim 6, wherein the first gear is smaller than the second gear and the gear transition is indicative of an upshift.

9. An apparatus comprising:
   a controller configured to:
      generate a SEN signal indicative of synthesized engine noise (SEN);
      modulate a characteristic of the SEN signal to align with a corresponding predetermined engine operating characteristic during starting conditions while a vehicle is propelled by an electric motor in response to an engine start signal; and
      provide an adjusted SEN signal, including the modulated characteristic, to a loudspeaker for projecting sound within a cabin of the vehicle.

10. The apparatus of claim 9, wherein the SEN signal is indicative of at least two engine orders.

11. The apparatus of claim 9, wherein the characteristic of the SEN signal comprises a frequency characteristic.

12. The apparatus of claim 11, wherein the controller is further configured to:
   generate the SEN signal based on an audio file; and
   modulate the frequency characteristic by adjusting a playback rate of the audio file.

13. The apparatus of claim 9, wherein the characteristic of the SEN signal comprises an amplitude characteristic.

14. The apparatus of claim 13, wherein the controller is further configured to:
   generate the SEN signal based on an audio file; and
   modulate the amplitude characteristic by adjusting a gain of the audio file.

15. The apparatus of claim 9, wherein the controller is further configured to:
   receive an input indicative of a gear transition, a vehicle speed, and pre-recorded engine sound during a transition between a first gear and a second gear; and
   modify the characteristic of the SEN signal by playing the pre-recorded engine sound in response to the gear transition indicating a change between the first gear and the second gear.

16. A computer-program product embodied in a non-transitory computer readable medium that is programmed for synthesizing engine noise (SEN), the computer-program product comprising instructions for:
   receiving an engine start signal indicative of an upcoming engine start and information indicative of engine operating characteristics;
   generating a SEN signal indicative of SEN;
   modulating a characteristic of the SEN signal based on the engine start signal to align with a corresponding engine operating characteristic during starting conditions; and
   providing an adjusted SEN signal, including the modulated characteristic, to a loudspeaker for projecting sound within a vehicle cabin.

17. The computer-program product of claim 16, wherein the characteristic of the SEN signal includes at least one of an amplitude and a frequency.

18. The computer-program product of claim 16, wherein the computer-program product further comprises instructions for:
   generating the SEN signal based on an audio file; and
   modulating a frequency characteristic of the SEN signal by adjusting a playback rate of the audio file.

19. The computer-program product of claim 16, wherein the computer-program product further comprises instructions for:
   generating the SEN signal based on an audio file; and
   modulating an amplitude characteristic of the SEN signal by adjusting a gain of the audio file.

20. The computer-program product of claim 16, wherein the computer-program product further comprises instructions for:
   receiving an input indicative of a gear transition, a vehicle speed, and pre-recorded engine sound during a transition between a first gear and a second gear; and modifying the characteristic of the SEN signal by playing the pre-recorded engine sound in response to the gear transition indicating a change between the first gear and the second gear.

\* \* \* \* \*